United States Patent Office 3,468,966
Patented Sept. 23, 1969

3,468,966
STABILIZATION OF 1,1,1-TRICHLOROETHANE
Wesley L. Archer, Midland, and Elbert L. Simpson, Auburn, Mich., assignors to The Dow Chemical Company, Midland, Mich., a corporation of Delaware
No Drawing. Filed Dec. 1, 1967, Ser. No. 687,123
Int. Cl. C07c *17/42*
U.S. Cl. 260—652.5         2 Claims

ABSTRACT OF THE DISCLOSURE

The reaction of 1,1,1-trichloroethane with aluminum is inhibited by the presence in the 1,1,1-trichloroethane of a small amount of a dissolved 2,5-hexanedione compound. Concentrations of the order of 0.005–1 gram mole per liter provide significant inhibition.

Background of the invention

This invention relates to the stabilization of chlorinated solvents. More particularly, the present invention concerns the stabilization of 1,1,1-trichloroethane in the presence of metallic aluminum.

Chlorinated hydrocarbons such as trichloroethylene and perchloroethylene are commonly used as solvents in chemical processes, dry cleaning, and metal degreasing. Solvents of this type are subject to slow decomposition and oxidation reactions, particularly in the presence of impurities such as water, traces of acid or metal salts. Corrosion of metal surfaces in containers and process equipment and deterioration of solvent quality by formation of acidic and colored byproducts thereby become serious problems. Inhibitors such as acid scavengers and antioxidants are commonly added to these solvents in order to prevent such degradative reactions. Inhibitor concentrations are normally of the order of one percent by weight or less.

1,1,1-trichloroethane poses a different and particularly difficult stabilization problem because of its unusual reactivity with certain metals, notably aluminum. Traces of metal salts, moisture, or other impurities are not needed to initiate the 1,1,1-trichloroethane-aluminum reaction, for this reaction occurs spontaneously on a freshly exposed aluminum surface with spectacular results, converting the solvent and the metal surface in a few minutes to a blackened mass of acidic, carbonaceous material and aluminum salts. Conventional acid acceptor stabilizers cannot be depended upon to inhibit the aluminum-1,1,1-trichloroethane reaction and suitable inhibitors must be discovered by independent investigation. The search has yielded few effective compounds and these show little or no obvious pattern of structure. Typical 1,1,1-trichloroethane formulations contain about five percent by weight of inhibitor which is usually a combination of compounds to inhibit reaction of the solvent with a variety of metals.

Summary of the invention

It has now been found that the 1,1,1-trichloroethane-aluminum reaction can be substantially retarded or prevented by incorporating into the 1,1,1-trichloroethane an inhibiting amount of certain aliphatic, cycloaliphatic, and aromatic diketones of 1,2- and 1,4-configuration. Active inhibitors of this group are 2,3-butanedione, 2,5-hexanedione, 1,2-cyclohexanedione, 1,4-cyclohexanedione, and p-benzoquinone. Such compounds may be used alone or in any combination with each other or with other nonreactive conventional inhibitors.

Detailed description

Only a quantity of diketone compound sufficient to retard or to stop the reaction of aluminum and 1,1,1-trichloroethane need be used. Although any significant amount will provide some inhibition, preferably about 0.005–1 gram mole per liter of 1,1,1-trichloroethane is employed and about 0.01–0.1 gram mole is usually most preferred.

Diketone compounds as defined by the general formula set forth above were tested for inhibiting activity in elongated glass test tubes having an inside diameter of 0.8 cm. and 33 cm. in length. To each vertically disposed tube there was added 0.54 g. of essentially pure 16–32 mesh granular aluminum and a solution of the inhibitor in purified 1,1,1-trichloroethane to make a total volume of test mixture of 5 ml. The closed ends of the test tubes were then immersed in an oil bath held at a temperature sufficient to maintain the 1,1,1-trichloroethane solution in each tube at a steady reflux. The results listed in the following examples indicate the minimum concentration of the inhibitor found effective to provide complete inhibition of the 1,1,1-trichloroethane-aluminum reaction for 24 hours under these conditions. Prevention of the reaction for this length of time under the described conditions indicates capacity for effective inhibition for an indefinite period. Concentrations are given in gram moles per liter, this figure being convertible to weight percent by the equation $$\text{wt. percent} = \frac{(\text{moles/liter})(\text{mol. wt. of inhibitor})}{13.46}$$

For example, a concentration of 0.10 g. mole per liter of an inhibitor of molecular weight 134.6 is equal to 1.0 weight percent of that inhibitor.

| Example No. | Compound name | Effective concentration, gram mole per liter |
|---|---|---|
| 1 | 1,4-cyclohexanedione | 0.03 |
| 2 | 1,2-cyclohexanedione | 0.04 |
| 3 | 2,5-hexanedione | 0.02 |
| 4 | 2,3-butanedione | 0.05 |
| 5 | p-Benzoquinone | 0.03 |

Diketones otherwise similar to compounds of the examples show considerably reduced inhibiting activity or are otherwise unsuitable. For example, 2,4-pentanedione is some 20–40 times less active than the aliphatic diketones of Examples 3 and 4 while 1,3-cyclohexanedione is too insoluble in 1,1,1-trichloroethane to show any inhibiting activity. o-Benzoquinone is unsuitable for such use because of its instability.

We claim:
1. 1,1,1-trichloroethane inhibited against reaction with aluminum by having dissolved therein a small but inhibiting amount of 2,5-hexanedione.
2. The 1,1,1-trichloroethane composition of claim 1 wherein 2,5-hexanedione is present in a concentration of 0.005–1 gram mole per liter.

References Cited

UNITED STATES PATENTS

| 2,376,075 | 5/1945 | Morris | 260—652.5 |
| 2,517,895 | 8/1950 | Larchar | 260—652.5 |
| 2,302,362 | 11/1942 | Nelles | 260—652.5 |

FOREIGN PATENTS 825,853  12/1959  Great Britain.

LEON ZITVER, Primary Examiner

MATTHEW M. JACOBS, Assistant Examiner

U.S. Cl. X.R.

252—170